May 25, 1971  G. W. BROWN  3,579,723
EXTRUDER-MOLDER

Filed July 25, 1969  6 Sheets-Sheet 1

INVENTOR.
GAYLORD W. BROWN
BY
*Learman & McCulloch*

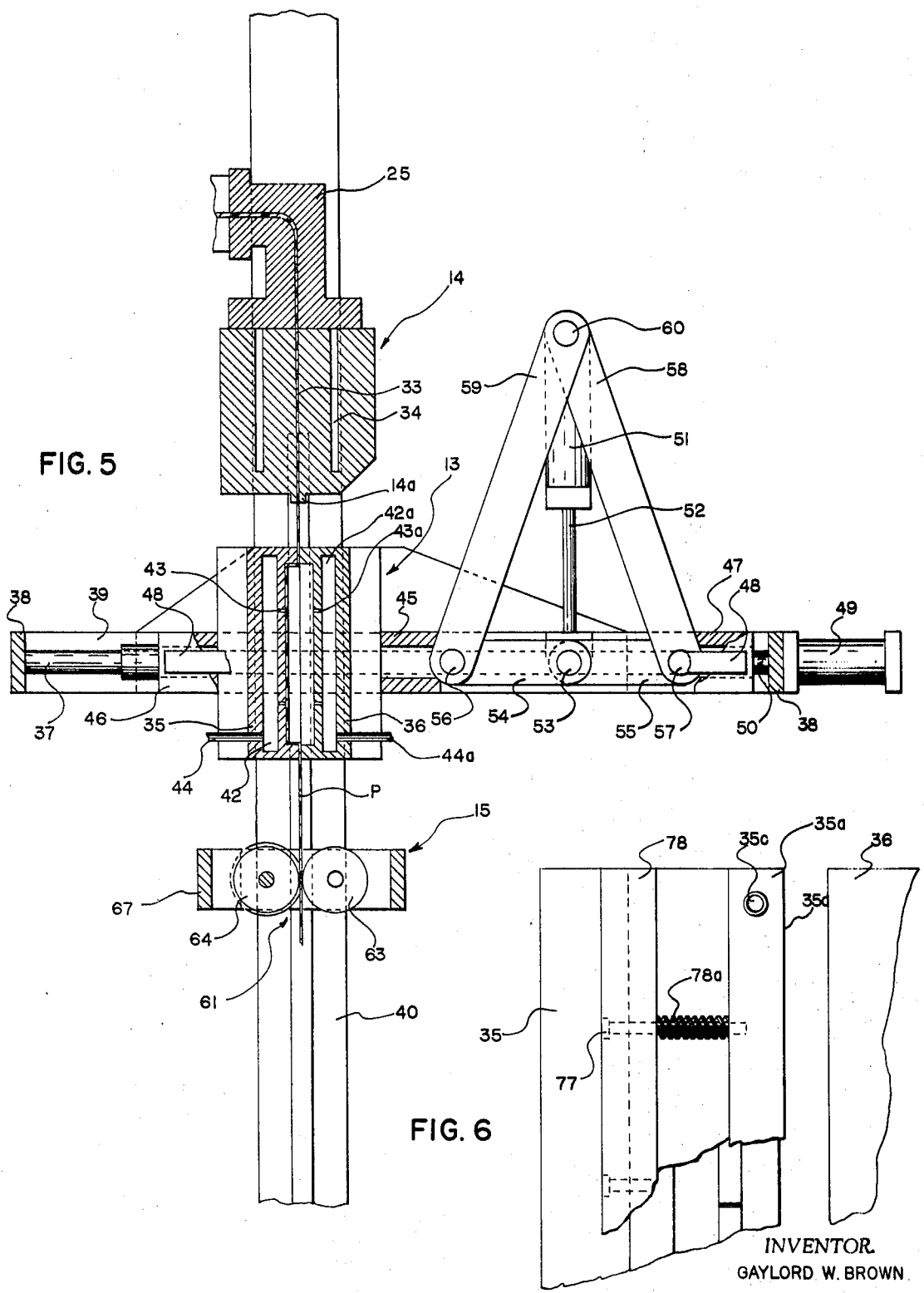

May 25, 1971 G. W. BROWN 3,579,723
EXTRUDER-MOLDER

Filed July 25, 1969 6 Sheets-Sheet 5

INVENTOR.
GAYLORD W. BROWN

BY
*Learman & McCulloch*

INVENTOR.
GAYLORD W. BROWN
BY
Learman & McCulloch

United States Patent Office 3,579,723
Patented May 25, 1971

3,579,723
EXTRUDER-MOLDER
Gaylord W. Brown, Beaverton, Mich., assignor to
Koehring Company, Milwaukee, Wis.
Filed July 25, 1969, Ser. No. 844,865
Int. Cl. B29c 3/04
U.S. Cl. 18—4          9 Claims

ABSTRACT OF THE DISCLOSURE

Extruding-molding apparatus wherein a sheet of synthetic plastic is directed vertically from an extruder to a differential pressure molding assembly which has molds movable into clamped relationship with the sheet. The molds are of less width than the extruding orifice of the extruding head so that a tight seal is assured and the edges of the plastic sheet are cooled at the side edges of the molds so that they may be gripped by members downstream from the mold assembly which support the weight of the sheet and prevent its tearing off, or orientation, under its own weight.

---

While combined extruding and molding apparatus have been proposed in the past, the problems encountered have limited the commercial use of such machines. In the past, it has for example, been difficult to prevent orientation or stretching of the soft sheet and this resulted in the production of articles which were not uniform in thickness and sometimes articles which were undesirably wrinkled.

One of the prime objects of the present invention is to provide a machine of the character described, capable of performing the extruding and thermoforming functions, wherein a plastic sheet or web is extruded vertically in a manner which permits the weight of the sheet to be supported from beneath.

A further object of the invention is to provide a commercially operable machine which permits scrap to be reground at its discharge end and immediately refed to its charge end.

Another object of the invention is to provide apparatus wherein mold apparatus completely seals the extruded plastic web when it clamps the web therebetween to perform a thermoforming operation and coolant channel means is provided on the molds to cool the protruding edges of the sheet so that they may be gripped downstream of the mold apparatus in a manner to support the weight of the sheet and prevent its tearing away from the extruder head discharge nozzle.

Still another object of the invention is to provide a system of the type mentioned wherein the sheet is supported downstream of the mold apparatus by spaced rollers, providing a gripping nip between them for receiving the cooled edges of the sheet, and driven at a speed substantially the speed of extrusion so as to exert substantially no pull on the sheet and minimize necking in and wrinkling of the sheet.

Briefly the invention relates to a machine which extrudes a sheet of plastic vertically to an openable and closable thermoforming mold asembly having coolant means for cooling only the side edges of the sheet so that it can be gripped and supported downstream between side edge receiving rollers revolving at a rate of speed to pass the sheet at substantially the extrusion rate.

The invention will be further understood by referring to the drawings incorporated herewith, in which:

In the drawings:

FIG. 5 is a similar view with the molds shown in closed position;

FIG. 6 is an enlarged, fragmentary, side elevational view illustrating the manner in which the coolant channels are mounted on one of the molds;

Figure 1:
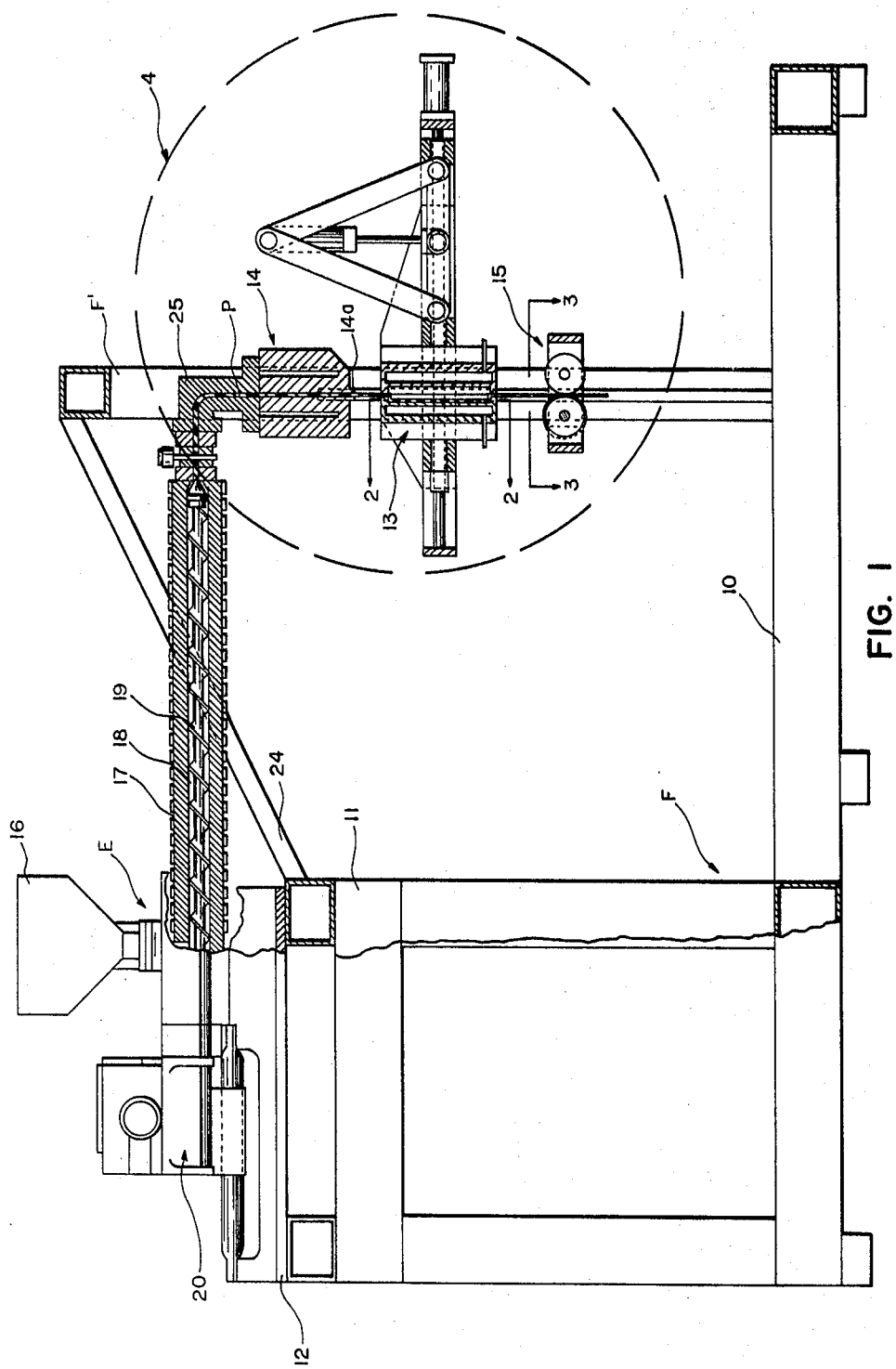
FIG. 1 is a partly sectional side elevational view of the apparatus with the molds shown in closed position.

Referring now more particularly to the accompanying drawings and in the first instance to FIG. 1, a letter F generally indicates the frame of the machine which broadly comprises a base or bed 10 and a table or platform 11 as shown. Mounted on a support plate 12 on the table 11 in a raised position is an extruder assembly, generally designated E, for delivering a plastic web or sheet, generally designated P, to a differential pressure thermoforming mold assembly generally designated 13 which forms desired shapes in the plastic sheet P. The plastic sheet P is in a soft and hot state as it passes from an extruding head assembly generally designated 14 and is still essentially at the extruding temperature and can be formed at the time it reaches the mold assembly 13. The extruder E operates intermittently to advance the plastic stream or web P in increments of substantially the length of the vertical height of the mold assembly 13.

Provided below the horizontally openable and closable mold assembly 13 is a roll assembly generally designated 15 which operates to support the plastic sheet P in vertical plumb as it moves downwardly, the roll assembly 15 serving to prevent the sheet P tearing off due to its own weight when the mold assembly 13 is in open position and also to prevent stretching and wrinkling thereof.

THE EXTRUDING ASSEMBLY

Figure 7:
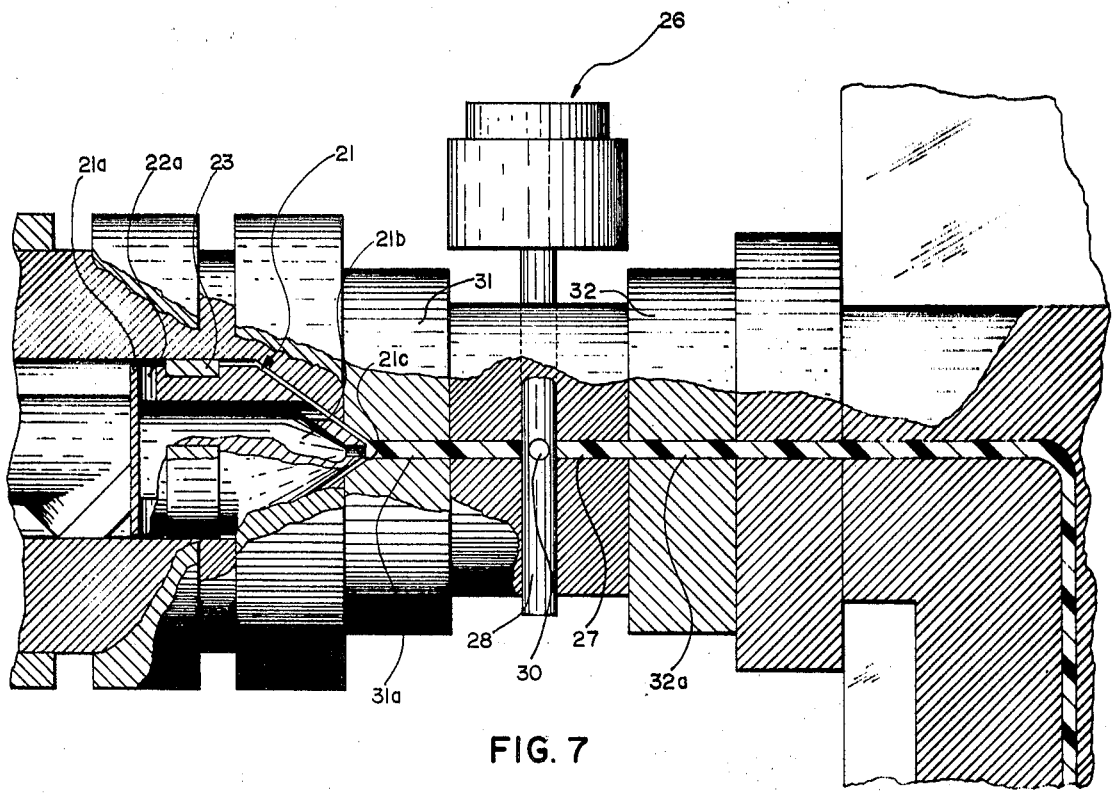
FIG. 7 is an enlarged sectional view illustrating the extrusion head in greater detail.

The extruding assembly E is, for the most part, a conventional reciprocating and rotating extruder of the type used commercially in injection molding operations. As shown, it comprises a feed hopper 16 into which plastic pellets or plastic forming materials are placed and a heated barrel 17 having an axial mixing and blending chamber 18 to which the plastic is gravity fed. Disposed within longitudinal chamber 18 is a reciprocating and rotating advancing screw 19. A pair of cylinders within a hydraulic drive housing, generally designated at 20, are provided for reciprocating screw 19 to incrementally advance the plastic sheet P in a manner which will be later described. At its front end the screw 19 mounts a hollow nozzle generally designated 21 (see FIG. 7) including a reduced diameter cylindrical rear portion 21a with circumferentially spaced apart openings 22a which lead to the nozzle bore 21b and a nozzle exit orifice 21c. The nozzle rotates in a ring bearing 23 which is slidable in the chamber 18.

Forwardly of the extruding assembly E, a vertical frame portion F' which supports the mold assembly 13 also supports a 90° elbow orifice 25 leading to the extruding head assembly 14 which is also supported in a stationary position by the frame portion F'. The frame portion F' is tied to the table 11 by braces 24.

Disposed between the elbow 25 and barrel 17 is a valve assembly generally designated 26 and having a plastic passages 27 interrupted by a vertically extending valve shaft 28. The rotatable valve shaft 28 has an orifice 30 which, when aligned with the passage 27, passes plastic through, but which may be rotated 90° to a non-aligned position (see FIG. 7) in which the flow of plastic through passage 27 is positively interrupted. On either side of the valve 26, sealing spacer plates 31 and 32 are provided which have plastic passages 31a and 32a, respectively, admitting and receiving plastic from the passage 27 respectively.

The extruding head 14 is a conventional extruding member with a passage 33 and has a nozzle portion 14a passage which releases a sheet of plastic which may typically be in the neighborhood of 20 inches in width. Heating elements or circulating coolant passages 34 maintain plastic issuing from extruder head 14 at the desired release temperature for the plastic being formed. For example, for polystyrene a typical extruding temperature may be 400° F. The desired extruding temperatures for various plastics are, of course, well known in the trade and it is not intended that those employed for various plastics should be other than conventional extruding temperatures. As the plastic P issues from the extruding head 14 in a downward direction, its weight tends to neck it in at the side edges and it is important that this necking-in be minimized. Accordingly, the mold assembly 13 is disposed near or substantially immediately adjacent the head 14 as shown in FIG. 1. The actual distance between extruding head 14 and the mold assembly 13, and the rate of extrusion, are carefully selected and with the machine of the present invention the material does not neck-in appreciably and vertical wrinkles are not present in the material to be formed by the mold assembly 13.

THE MOLD ASSEMBLY

Figure 4:
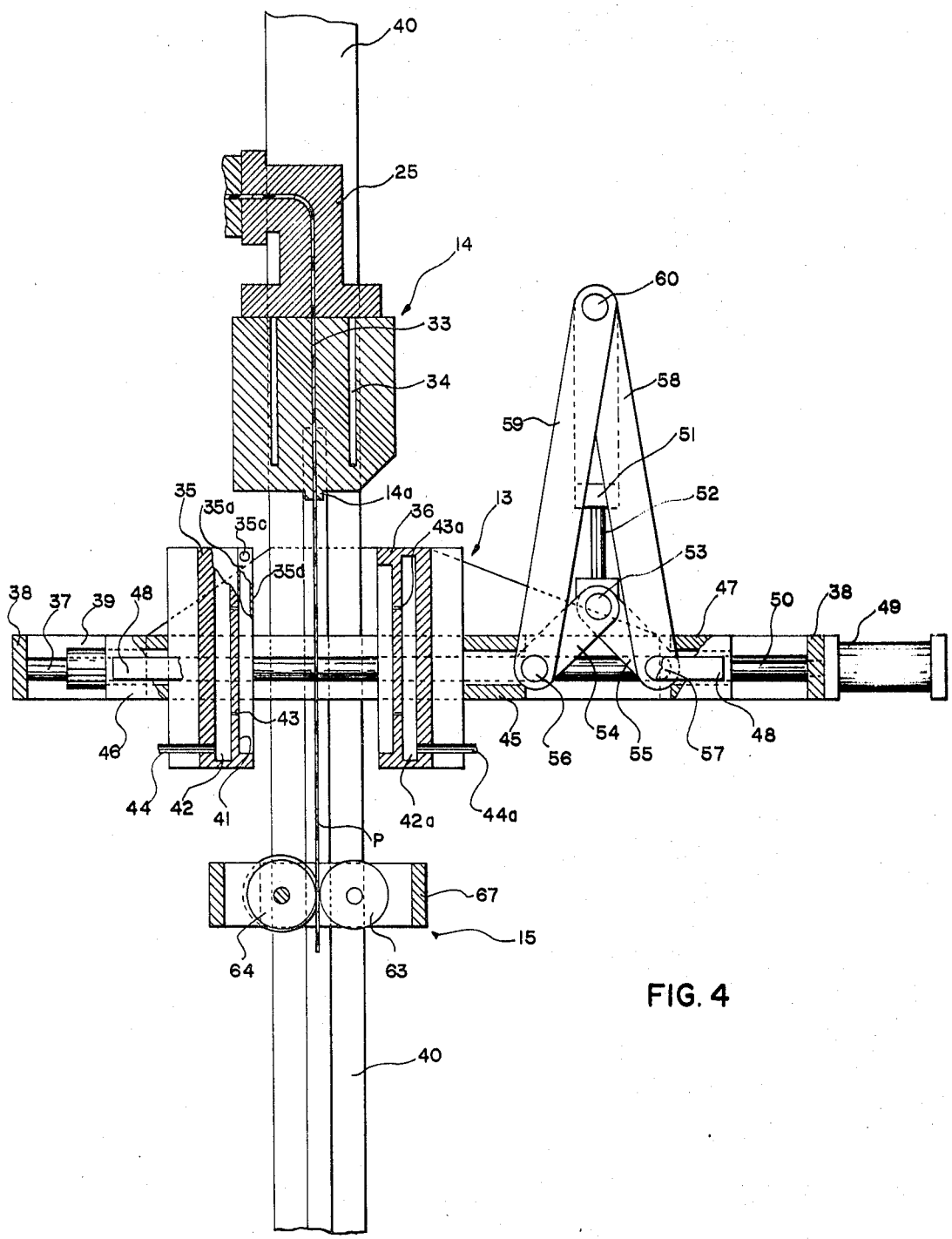
FIG. 4 is an enlarged, fragmentary, sectional side elevational view of the area identified by the circle 4 in FIG. 1 with the molds shown in spread apart position.

The mold assembly 13 is comprised of a pair of horizontally reciprocable mold members 35 and 36 mounted for horizontal travel on pairs of guide rods 37 which are connected at their ends by rail members 38. Rails 38 and similar longitudinally extending rails 39 comprise a rectangular support framework which is connected to and supported by the vertical posts or pillars 40 forming the vertical supports of the framework sub frame F'. FIGS. 4 and 5 particularly illustrate the mold assembly 13. The mold 35 includes a mold cavity 41 connected to vacuum chamber 42 which communicates therewith through openings 43 in the usual manner, the chamber or manifold 42 being connected by the line 44 with a conventional vacuum pump or the like. The mold 36 has an air chamber 42a supplied by an air hose 44a from a suitable air source at the proper time to deliver air to assist in forming through the ports 43a. The mold 36 is connected to a hollow platen 45 and the mold 35 to a hollow platen 46.

At the right end of the frame in FIGS. 4 and 5 a platen 47 is provided as shown which is connected with the platen 46 by means of straps 48. A biasing air cylinder 49 mounted on the frame 38 has its piston rod 50 connected with the platen 47 as shown and normally operates to urge the platen 47 to the left in FIG. 4. Provided to move the molds 35 and 36 toward the plastic sheet P is a pressure operated cylinder 51 having a piston rod 52 pivotally connected as with a pin 53 to links 54 and 55 which are connected via the pins 56 and 57 to the platens 45 and 47 respectively. Links 58 and 59 are similarly connected to pins 56 and 57 and at their opposite ends are pivotally connected by a pin 60 to the upper end of the cylinder 51.

When the piston rod 52 of cylinder 51 is extended as shown in FIG. 5, the platen 45 is first moved to the left in FIG. 4, due to the fact that cylinder 49 opposes the movement of platen 47 to the right. Once the mold 36 has come into engagement with the plastic sheet P the platen 47 will be moved to the right in FIG. 4 because the full force of the cylinder 51 will be applied to overcome the fluid pressure maintained in cylinder 49 and the movement will be transmitted via straps 48 to the platen 46 which will move the mold 35 to the right into engagement with the plastic sheet P.

Figure 3:
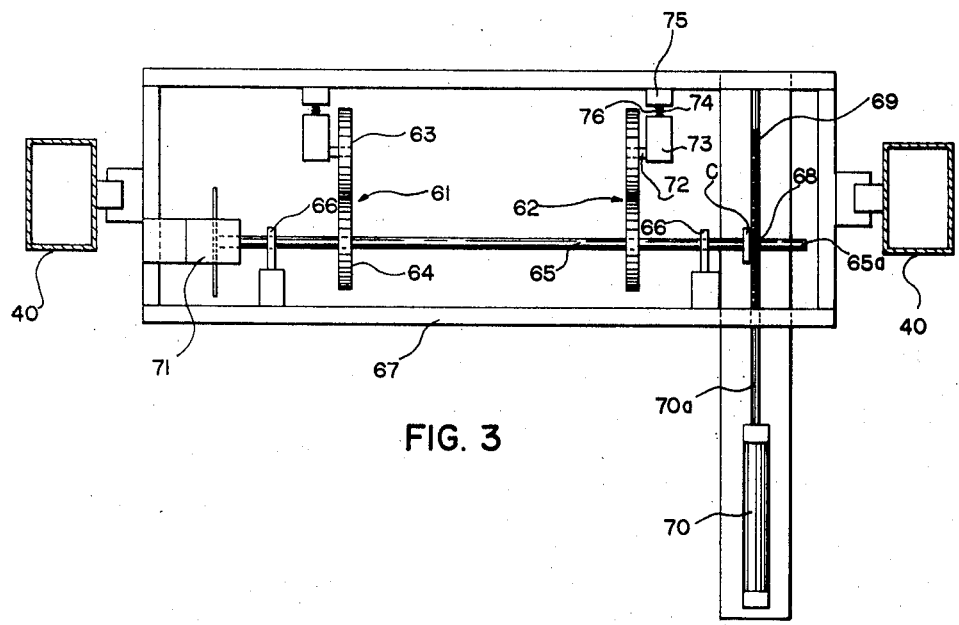
FIG. 3 is an enlarged sectional plan view taken on the line 3—3 of FIG. 1.

Disposed beneath the mold assembly 13 are the spaced apart pairs of rolls or wheels, generally designated 61 and 62, as shown in FIG. 3. Each pair of wheels 61 and 62 is comprised of wheel members 63 and 64, wheels 64 being mounted on a shaft 65 supported by bearings 66 from a rectangular framework 67 mounted stationarily on the vertical columns 40. At one end, the shaft 65 connects with a conventional commercially available overrunning clutch C which has an input shaft 65a, mounting a spur gear 68 in mesh with a transversely extending rack gear 69 powered by a fluid pressure operated cylinder 70. At its opposite end the shaft 65 is received by a conventional electrically controlled air brake designated 71 which is operative to hold the shaft 65 in position while the gear 69 connected with the piston rod 70a of cylinder 70 is retracted and to prevent overrunning at all times.

Wheels 63 are mounted on shafts 72 carried by blocks 73 reciprocably mounted on shafts 74 extending from blocks 75 which are fixed to the framework 67. Coil springs 76 mounted on the shafts 74 preload the blocks 73 and urge the wheels 63 in a direction toward the wheels 64 to maintain a predetermined gripping pressure on the plastic web P. The framework 67 and framework 38–39 may be adjusted vertically as desired in any suitable manner.

Figure 2:
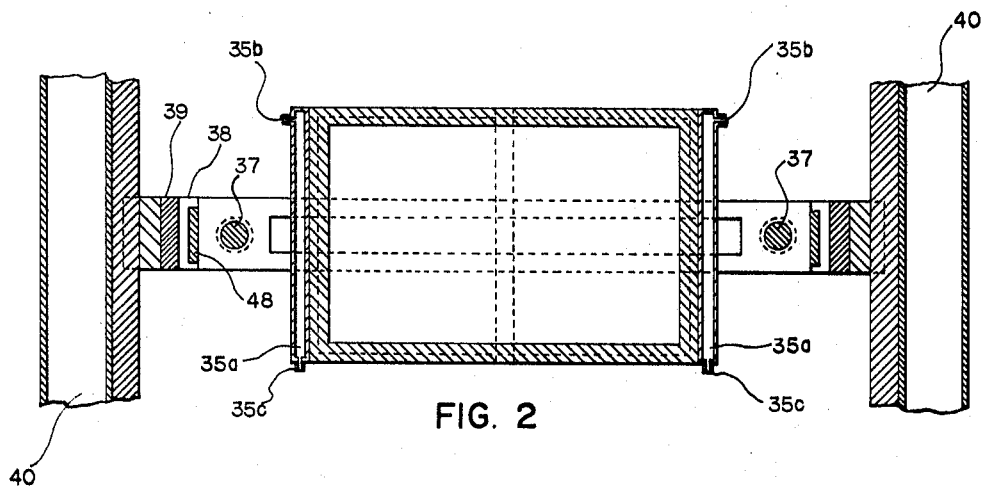
FIG. 2 is an enlarged, fragmentary, transverse sectional view taken on the line 2—2 of FIG. 1.

As FIGS. 2 and 6 particularly indicates, the side edges of the mold 35 are provided with coolant chamber or ducts 35a. Water, for instance, at a temperature of about 38° F. is continuously circulated through the chambers 35a via the inlet and exit lines, 35b and 35c, respectively. The purpose of the side edge cooling chambers 35a which provide very thin temperature conducting walls 35d in contact with the plastic sheet P is to harden or set the edges of the plastic sheet P to enable them to be gripped by the wheels 63 and 64. The ducts 35a are mounted for movement toward the mold 36 on pins 77 provided on members 78 which are fixed to the sides of mold 35. Springs 78a urge the ducts 35a outwardly and are compressed when the ducts 35a are moved into engagement with the plastic sheet P which is backed by mold 36.

Rolls 63 and 64 which grip the cooled and relatively hard side edges of the plastic sheet P are operated at a speed which exerts substantially no pull on the plastic sheet P. The plastic sheet P, in other words, is permitted to move downwardly at the speed reached by permitting it to move under the forces of gravity so that the wheels 63 and 64 can in effect, perform a support function which prevents tearing off or stretching of the sheet P under the influence of its own weight.

Figure 8:
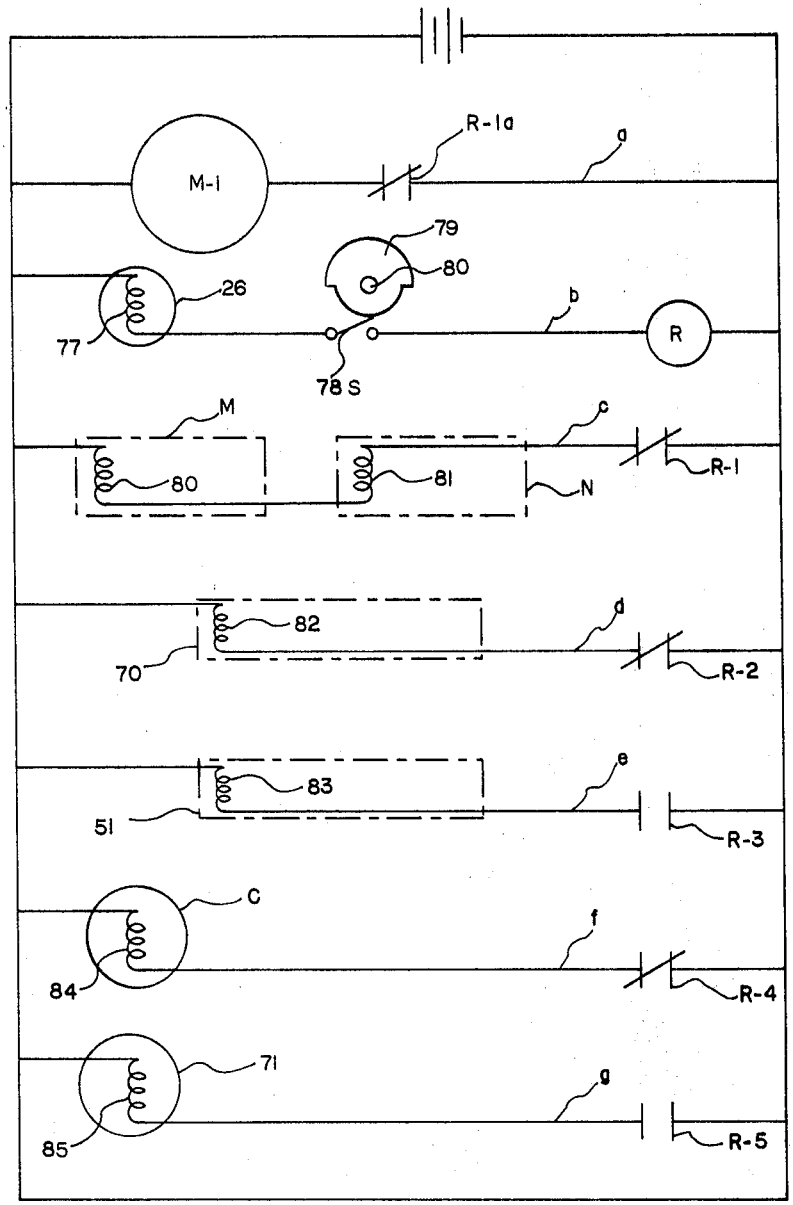
FIG. 8 is a typical electrical control circuit schematically illustrated.

In FIG. 8 only a typical electrical circuit is shown and it is to be understood that other workable circuits may also be utilized to accomplish the functions to be performed in a similar manner. A motor M–1 for revolving the advancing screw 19 in a direction to forward material is shown in a circuit line a in FIG. 8. Provided in a circuit line b is a normally open, solenoid operated, spring returned valve 26 which includes an energizable valve closing coil 77. A cam operated switch 78 and a relay R are also provided in the circuit line b as shown. A timing cam 79 mounted on a continuously driven shaft 80 may be provided for closing the normally open spring returned switch 78.

Provided in a circuit line c are the advancing solenoids 80 and 81 of the pair of fluid pressure operated cylinders in housing 20 which are in series with the normally closed contacts R-1 of relay R. The piston retracting solenoid 82 of a spring returned fluid pressure operated cylinder 70 is provided in a circuit line d in series with the normally closed contacts R-2 of relay R. Provided in a circuit line e is the piston advancing solenoid 83 of the mold closing fluid pressure operated spring returned cylinder 51 in series with the normally open contacts R-3 of relay R. A valve solenoid 84 controlling the operation of a normally disengaged clutch C is provided in circuit line f in series with the normally closed contacts R-4 of relay R and a brake energizing solenoid 85 for the brake 71 is provided in a circuit line g in series with the normally open contacts R-5 of relay R.

In operation, the motor M revolves so that screw 19 advances the material in a forwarding direction. When solenoids 80 and 81 of cylinders M and N which may be conventional hydraulic cylinders are energized, the revolving screw 19 is moved linearly forwardly. Valve 26 is open and material is being extruded from the discharge lips 14a of the extruding head assembly 14. At this time the piston rod of air cylinder 51 is in retracted position and the mold halves 35 and 36 are in the position in which they are shown in FIG. 4 removed from the sheet P. The wheel members 63 and 64 are being revolved in a direction and at a speed to pass the plastic web P downwardly at a linear raate of speed which is substantially the rate of extrusion from nozzle 14a. In practice it has been found desirable to revolve wheels or rolls 64 at a speed such as to pass the sheet at about 5% greater than the speed of extrusion to support the weight of the sheet while removing wrinkles, and without undesirably orienting the sheet. In actuality the wheels 63 and 64 are substantially supporting the weight of the hot sheet and preventing it from tearing off the nozzle lips 14a due to its own weight. The support function performed by the wheels 63 and 64 also prevents the sheet from necking in or reducing in width which otherwise would occur because the material has such little hot strength. Thus, with wheels 63 and 64 exerting substantially no pull, the rate of extrusion is substantially the rate of travel due to extrusion forces and no stretching of the sheet occurs. The rate of extrusion chosen is geared to the weight of the material and the necessary operating parameters are chosen for the particular material and the size thereof to be extruded.

At the time the sheet is being extruded and valve 26 is open, relay R is deenergized and contacts R-1 are closed. Contacts R-3 are open and the piston rod of cylinder 51 is retracted. Contacts R-2 are closed so that solenoid 82 is energized causing the cylinder 70 to drive wheels 64. At this time contacts R-4 are also closed so that the normally disengaged clutch C is engaged. Contacts R-5 are open so that the normally disenaged brake 71 is disengaged or inoperative.

When timing cam 79 closes switch 78, solenoid 77 is energized to close valve 26 and also to energize relay R. At this time the buildup of pressure in the barrel chamber 18, due to rotation of advancing screw 19 while valve 26 is closed, causes the piston rods of hydraulic cylinders M and N to be retracted, energization of relay R having opened contacts R-1 to deenergize the advancing solenoids 80 and 81. At the same time contacts R-3 are closed, and so solenoid 83 of cylinder 51 is energized to operate to close the molds 35 and 36 in the manner indicated to clamp the plastic sheet P securely therebetween. Simultaneously with the closing of valve 26, contacts R-2 were opened to deenergize the solenoid 82 of cylinder 70 and permit the rack member 69 to be returned under the influence of the return spring in the cylinder 70. At this time also, the contacts R-4 have opened to deenergize the solenoid 84 of clutch C and permit it to disengage and the solenoid 85 of brake 71 is energized so that the brake 71 is engaged. Once the mold assemblies 35 and 36 are in closed clamped relation, a limit switch, or another timing cam mounted on shaft 80, operates conventional air and vacuum valves to communicate air pressure and suction forces with the molds 35 and 36 in the usual manner and perform the thermo forming operation.

Thereafter, timing cam 79 closes switch 78 and the extruding portion of the cycle is commenced once again. The closing of switch 78 closes the contacts R-3 and causes cylinder 51 to withdraw molds 35 and 36 to remote position, activates cylinders M and N to advance the screw 19, operates cylinder 70 to drive wheels 64, and causes the engagement of clutch C and disengagement of brake 71.

Motor M-1 may be stopped via time delay relay contacts R-1a, once cylinders M and N are returned, and then restarted to commence a new cycle. Further, the system within the scope of the invention claimed could comprise a continuously extruding device and a mold assembly which traveled along the path of the extruded sheet in a reciprocating stroke.

The foregoing descriptive manner is intended to be illustrative rather than definitive of the invention which is defined in the appended claims.

I claim:

1. Apparatus for forming articles in a sheet of synthetic plastic comprising: extrusion means for extruding a hot deformable plastic sheet; opposed molds downstream from said extrusion means, between which said extruded sheet is received, and relatively movable to remote and closed positions, at least one of said molds having cavity means; transversely spaced means for cooling the edge portions of said sheet adjacent the molds; and means spaced transversely substantially the same distance apart as said latter means downstream from said molds for engaging and supporting the cooled and set edges of said sheet as it moves away from said molds.

2. The combination defined in claim 1 wherein said engaging and supporting means comprises pairs of sheet gripping members and said cooling means comprise elongate coolant channels through which a coolant fluid is circulated.

3. The combination defined in claim 2 in which said gripping members comprise rolls.

4. The combination defined in claim 3 in which said extrusion means releases said sheet vertically; said molds move horizontally toward and away from said sheet; and drive means for moving said rolls only substantially at a speed equal to the rate of extrusion.

5. The combination defined in claim 4 in which said sheet is extruded intermittently with periods of dwell between sheet movements; power operated means moves said molds together and apart during said periods of dwell; and means is provided for creating a differential forming pressure on opposite sides of said sheet.

6. The combination defined in claim 5 in which said means for driving said rolls moves said rolls intermittently to conform to the intermittent movements of said sheet.

7. The combination defined in claim 2 in which said channels are rectilinear ducts extending along the sides of and carried by one mold only; and means on said one mold for biasing said ducts in a direction toward the other mold.

8. Apparatus for forming articles in a web of synthetic plastic material; extrusion means for vertically extruding a hot deformable plastic sheet at extrusion temperature; opposed molds directly below said extrusion means, between which said extruded sheet is received, and relatively movable to remote and closed positions, at least one of said molds having cavity means, means for intermittently interrupting the flow of extruded material for a dwell period; means for moving said molds to closed position to clamp said sheet therebetween during said dwell period and thence moving said molds apart during said period; sheet gripping means downstream from said molds for engaging and supporting said sheet as it moves away from said molds; and disengageable means for moving said sheet gripping means at a speed to move said sheet at substantially the rate of extrusion thereof during said period of dwell only.

9. The combination defined in claim 2 in which said sheet gripping means comprises oppositely disposed rolls between which said sheet is received; and spring means urges said oppositely disposed rolls to closed position.

References Cited
UNITED STATES PATENTS

| | | | |
|---|---|---|---|
| 3,089,192 | 5/1963 | Adams | 18—5X |
| 3,271,816 | 9/1966 | Schneider | 18—4 |

GRANVILLE Y. CUSTER, JR., Primary Examiner